United States Patent [19]
Bonne

[11] 3,825,344
[45] July 23, 1974

[54] DEVICE FOR ANALYSING A SUBSTANCE BY ATOMIC ABSORPTION WITH BACKGROUND CORRECTION

[75] Inventor: Roger Bonne, Malakoff, France

[73] Assignee: Commissariat a l'Energie Atomique, Paris, France

[22] Filed: Sept. 6, 1972

[21] Appl. No.: 286,844

[30] Foreign Application Priority Data
Sept. 14, 1971  France .............................. 71.33035

[52] U.S. Cl. ........................ 356/85, 356/95, 356/97
[51] Int. Cl. ............................................. G01j 3/42
[58] Field of Search ............................... 356/85–87, 356/96, 97, 93, 95, 82

[56] References Cited
UNITED STATES PATENTS

| | | | |
|---|---|---|---|
| 2,847,899 | 8/1958 | Walsh | 356/95 |
| 3,413,482 | 11/1968 | Ling | 356/96 UX |
| 3,586,441 | 6/1971 | Smith et al. | 356/97 |
| 3,689,158 | 9/1972 | Shifrin | 356/93 X |

OTHER PUBLICATIONS

Perkin-Elmer Brochure, Perkin-Elmer Models 290B and 303, Atomic Absorption Spectrophotometer, page 13.

Primary Examiner—Ronald L. Wibert
Assistant Examiner—F. L. Evans
Attorney, Agent, or Firm—Flynn & Frishauf

[57] ABSTRACT

The invention relates to a device for analysing a substance by atomic absorption with background correction in which the substance is vaporised in a chamber and light beams are transmitted through the vapour from two light sources, one of which has a band wavelength spectrum while the other has a line spectrum, one of the lines being centred at the atomic absorption wavelength. A monochromator is centred at the atomic absorption wavelength for alternately receiving the light beams and a photoelectric detector is disposed at the monochromator output for supplying electric signals. According to the invention electric modulators act on the electric supplies to the light sources for modulating the light beams substantially in the form of square waves of equal duration. The modulators are synchronised with one another and with comparison means which compares the electric signals supplied by the detector. A stationary semi-transparent mirror is disposed in the path of the two beams so that the beams follow the same path from the mirror to the monochromator.

5 Claims, 6 Drawing Figures

DEVICE FOR ANALYSING A SUBSTANCE BY ATOMIC ABSORPTION WITH BACKGROUND CORRECTION

The invention relates to a device for analysing a substance by atomic absorption with background correction. More particularly the device can show the concentration of an element in a substance being analysed by the atomic absorption method.

The atomic absorption method of measuring the concentration of an element in a substance consists in conveying the substance in vapour form through a light beam having a wavelength corresponding to an absorption peak of light by the aforementioned element. The substance to be analysed is evaporated in a chamber having two opposite transparent portions allowing a light beam to travel through it. The element whose concentration is to be determined is then in atomic form. Roughly speaking, measurements are made of the intensity of the light beams emerging from the chamber at the aforementioned wavelength, in the absence and in the presence of vapour in the chamber. The ratio between the two intensities can be used, after calibration, to determine the concentration of the element in the vapour. However, the vapour contains other elements, which sometimes absorb an appreciable amount of the light beam. This light absorption, which is not due to the element to be analysed, is called the "background absorption". The background absorption may be negligible, but in some cases it distorts the measurement by atomic absorption and has to be eliminated. Background absorption may have various origins, including molecular absorption.

The invention and its background will be described by way of example with reference to the accompanying drawings, wherein.

Figure 1:
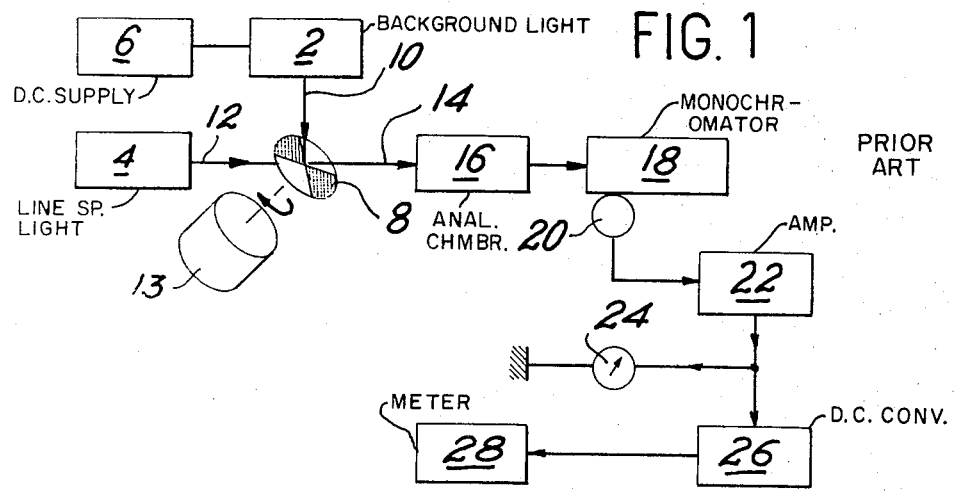
FIG. 1 is a block diagram of a prior device for analyzing a substance by atomic absorption with background correction.

In the conventional method of compensating background absorption, two light sources 2 and 4 are used, source 2 having a band wavelength spectrum (a continuous spectrum) and source 4 having a line spectrum. A d.c. electric supply unit 6 supplies source 2. Source 4 is usually a hollow cathode and source 2 can be e.g. a deuterium or iodine lamp. A rotating mirror, disposed at the intersection of the light beams 10, 12 emitted by sources 2, 4 respectively, is rotated by a motor 13. Beam 12 travels directly via the uncovered part of the rotating member 8, whereas beam 10 is reflected. The beams are alternately mechanically chopped to form a light beam 14 which travels through a chamber 16 in which the substance to be analysed has been vaporised. Consequently, the vapour in chamber 16 contains the element in atomic form whose concentration is to be determined. The element has an absorption peak for light at a given characteristic wavelength. Next, the light beam 14 enters a monochromator 18 centred at the wavelength corresponding to the absorption peak of the element. A photoelectric detector 20 disposed at the output of monochromator 18 supplies electric signals amplified by an amplifier 22. The amplified electric signals enter a milliammeter 24 and also enter an a.c. - d.c. converter 26 which converts the a.c. signal from amplifier 22 to a d.c. signal having an amplitude proportional to the absorption. The d.c. signal is recorded with respect to time on a meter 28. The principle of background absorption compensation is based on the fact that light having a band spectrum (source 2) is absorbed to a practically negligible extent by the element whose concentration is to be determined, whereas light having a line spectrum (source 4) is very strongly absorbed by the element at the wavelength corresponding to the absorption peak. On the other hand, elements other than the element whose concentration is to be determined absorb the same quantity of light (background absorption) from beams 10 and 12. Consequently, in the absence of the element whose concentration is to be determined, the device is set to zero (zero of milliammeter 24 and meter 28) by equalising the quantities of light from the two sources. Next, in the presence of the element whose concentration is to be determined, a measurement is made of the ratio of the intensities of the two beams 10, 12 after they have alternately travelled through chamber 16. The aforementioned ratio, after the device has been calibrated, can show the concentration of the element.

The prior art device, however, has a serious disadvantage in that the light beams 10, 12 are mechanically chopped by a rotating mirror 8. The light signals comprising beam 14 leaving mirror 8 are not modulated in the form of square waves but in the form of trapezia, with the result that the leading and trailing edges of the light signals cannot be very steep. Furthermore the leading edge of a light signal coming from one of the two sources overlaps the trailing edge of the preceding signal emitted by the other source; the overlap periodically produces a slight intensity peak in light beam 14 (instead of giving a constant intensity), so that it is difficult to obtain the actual zero of the device by equalising the quantities of light in two successive pulses corresponding to the chopping of light beams 10, 12 travelling through chamber 16.

The invention provides a device which meets practical requirements better than prior art devices more particularly in that it provides exact compensation of the background absorption and an accurate determination of the absorption zero.

To this end, the invention provides a device for analysing a substance by atomic absorption with background correction, comprising means for vaporising the substance in a chamber, two light sources having a band wavelength spectrum in one case and a line spectrum in the other case, one of the lines being centred at the atomic absorption wavelength, a monochromator centred at the aforementioned wavelength and alternately receiving the light beams transmitted by the aforementioned two sources after the beams have travelled through the vapour, a photoelectric detector disposed at the monochromator output and means for comparing the electric signals supplied by the detector, said device being characterised by two electric modulators each acting on the electric supply to one of the aforementioned sources and modulating the light beams substantially in the form of square waves of equal duration, means for synchronizing the modulators with one another and with the comparison means, and a stationary semi-transparent mirror disposed in the path of the two beams so that the beams follow the same path from the mirror to the monochromator.

The invention will be more clearly understood from the following description of a non-limitative embodiment of the invention, given by way of illustration.

Figure 2:
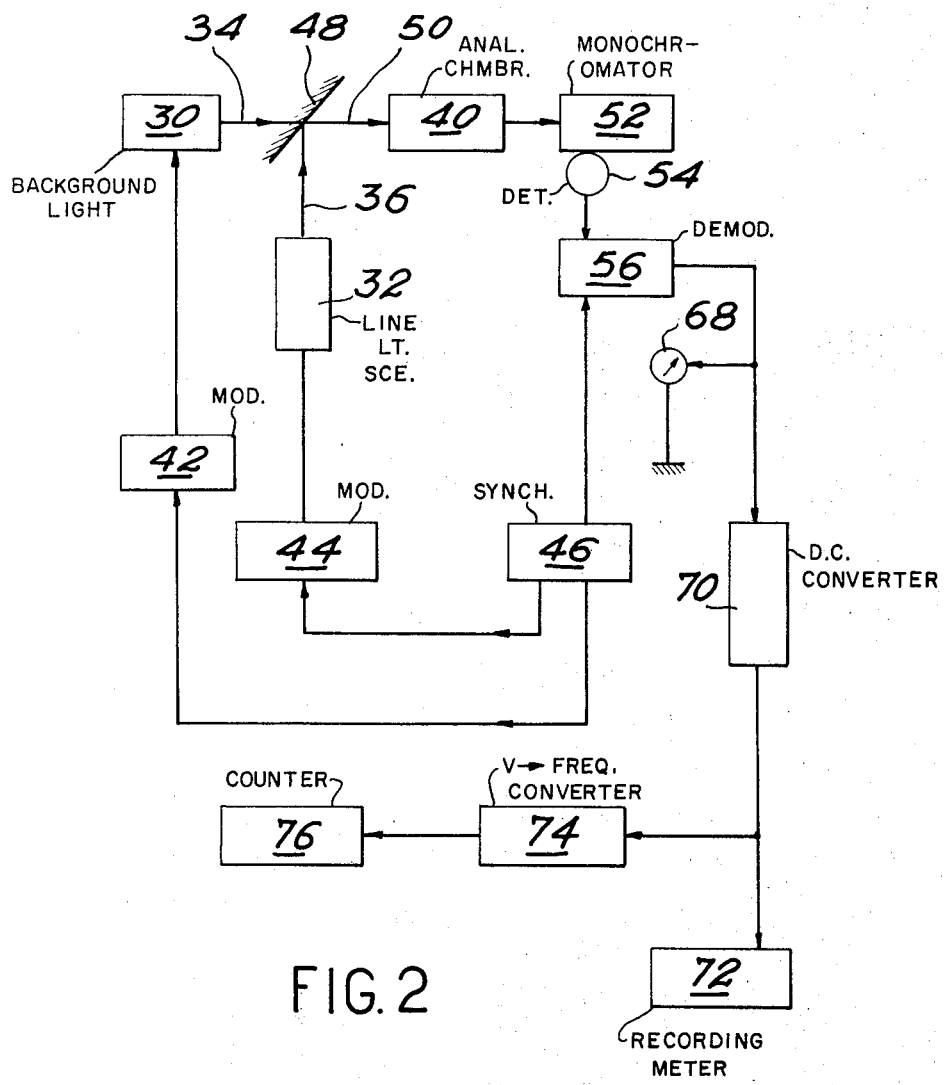
FIG. 2 is a block diagram of a device for analyzing a substance by atomic absorption and eliminating background absorption in accordance with the present invention.

The device shown in FIG. 2 comprises two light sources 30, 32 emitting light beams 34, 36 respectively. Source 30 emits light having a band wavelength spectrum, whereas the light emitted by source 32 has a line spectrum. Advantageously, source 30 is deuterium or iodine source. Source 32 can be a hollow cathode. One of the spectral lines in the light emitted by source 32 corresponds to the absorption peak of the element whose concentration is to be measured in the substance analysed, which is vaporised in a chamber 40 sometimes called an "atomiser furnace". According to the invention, the light beams 34, 36 are not mechanically modulated, e.g. by a rotating mirror, but are electronically modulated. Each electric unit applying light sources 30, 32 is associated with an electronic modulator 42, 44 respectively. The modulators are actuated and synchronised by a synchronisation circuit 46. Modulators 42, 44 modulate light beams 34, 36 respectively in the form of a series of square waves of equal duration, the leading edge of a square wave of beam 34 corresponding to the trailing edge of a square wave of beam 36. Modulation is total, i.e. the minimum light intensity of beams 34, 36 corresponds to the extinction thereof. This modulation is shown, with respect to time, on FIG. 3a, the upper part of the graph showing the light signals from one of the two beams 34, 36 and the lower part showing the light signals from the other beam. The intensities of the two beams are made equal by means of potentiometers on elements 42 and 44 (not shown in FIG. 2). Since the duration of the square waves is identical for both beams, each beam transmits the same quantity of light for each square wave. A semitransparent mirror 48 disposed at the intersection of beams 34, 36 produces a light beam 50. Beam 50 travels through chamber 40 containing the vapour to be analysed and then enters a monochromator 52 centred at the wavelength corresponding to the absorption peak of the element whose concentration is to be determined. A photoelectric detector 54 at the output of monochromator 52 provides an electric signal which is amplified and subsequently demodulated by a demodulator 56, which is actuated by a synchronisation circuit 46 in synchronism with the modulation of the light emitted by sources 30 and 32.

Demodulator 56 first detects the electric signals synchronized with the light signals from beams 34, 36. Signals 58, 60 shown in FIGS. 3b are detected in this manner. In FIG. 3, the signals 58 correspond to the light signals emitted by source 32, which have a narrow spectral width; these light signals have been partially absorbed, during their passage through chamber 40, by the element whose concentration is to be determined. The decrease in the intensity of signals 58 corresponds to atomic absorption, which can be used to measure the concentration of the absorbing element in the substance under analysis. If there is no atomic absorption, i.e. in the absence of the element in question, signals 58 and 60 have the same intensity I. The ratio of the intensities of signals 58 and 60 can be used to determine the amount of light absorbed and, after calibrating the device, to determine the concentration of the element. If there is an absorption background, e.g. interfering absorption due to molecular absorption, the intensities of signals 58, 60 are attenuated by the same amount, so that the ratio of the aforementioned signals is not effected by an absorption background. Consequently, the interfering absorption is eliminated and the device according to the invention has accurate background correction. After synchronous detection has been performed, the demodulator 56 changes the origin of the amplitudes of electric signals 58 and 60, the new origin of the intensities I being taken as the average value of signals 58, 60 when the light beams are not absorbed in chamber 40. The average value is determined while the device is being calibrated, before the measurement proper. The change of origin yields signals 62, 64 shown in FIG. 3c. As FIG. 3d shows, the sum S of signals 62, 64 supplies signals 66 representing the quantities of light absorbed by atomic absorption by the element whose concentration is to be determined. The sum S can be obtained e.g. in a capacitor. Signals 66 leaving modulator 56 enter a milliammeter 68 previously calibrated from 0 to 100% absorption and also enter an a.c. - d.c. converter 70 for converting signals 66 to a d.c. signal having an amplitude proportional to the area of the signals 66. Consequently the amplitude of the d.c. signal is proportional to the quantity of light absorbed by the element whose concentration is to be measured. Next the d.c. signal is recorded with respect to time by a meter 72 and converted by a voltage frequency converter 74 to a frequency signal proportional to its amplitude, the frequency of the signal being measured by a counter 76. Converter 74 is a recurrence-signal circuit, the frequency of the signals being proportional to the amplitude of the d.c. signal supplied by the a.c. - d.c. converter 70. Counter 76 can e.g. be a scaler.

Figure 3A:
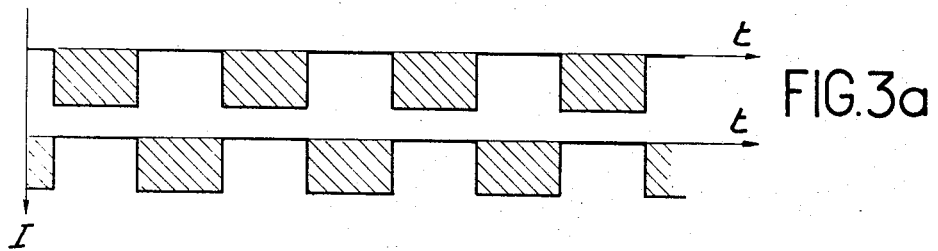
FIG. 3(a-d) is a timing diagram showing the wave form, with respect to time $t$, of various light and electric signals occurring in the embodiment of the invention shown in FIG. 2.
Figure 3B:
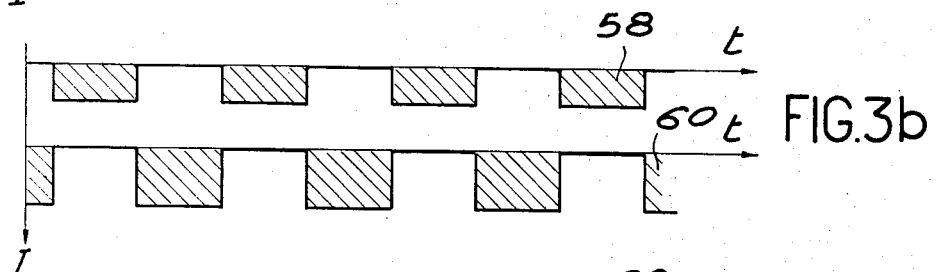
Figure 3C:
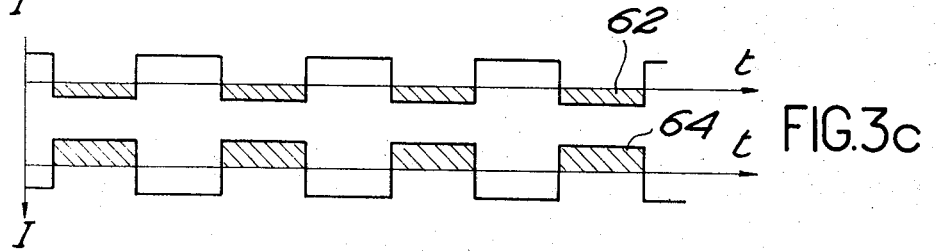
Figure 3D:
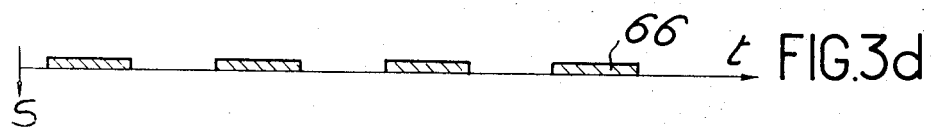

The modulation of the light admitted from sources 30, 32 is advantageous but may be performed differently from the manner shown in FIG. 3a, which is given by way of example only. The signal detection means provided by demodulator 56 form a complete measuring assembly but are not all necessary; the apparatus could, for example, be reduced to the milliammeter 68 or the meter 72.

I claim:

1. A device for analysing a substance by atomic absorption with background correction, comprising:
   means for vaporising the substance in a chamber,
   two light sources, one having a a band wavelength spectrum and the other a line spectrum, one of the spectrum lines being centered at the atomic absorption wavelength,
   a monochromator centered at the aforementioned wavelength and alternatively receiving the light beams transmitted by the aforementioned two sources after the beams have travelled through the vapour,
   a photoelectric detector disposed at the monochromator output and means for comparing the electric signals supplied by the detector,
   said device being characterised by
   a stationary semi-transparent mirror disposed in the path of the two beams so that the beams follow the same path from the mirror to the monochromator, electric modulators each acting on the electric supply to one of the aforementioned sources and modulating the light beams substantially in the form of square waves of equal duration in such a manner that the leading edge of a square wave for one of the two aforementioned light beams corresponds to the trailing edge of the square wave of the other light beam, means for synchronizing the modulators with one another and with the aforementioned comparison means, means included in said comparison means for changing the origin of the amplitude of the square-wave electric signals supplied by the detector, the new origin being taken as the average value of the amplitudes in the absence of atomic absorption by the vaporised substance, and an a.c. - d.c. converter.

2. A device according to claim 1, characterised in that the light source having a line spectrum is a hollow cathode.

3. A device according to claim 1, characterised in that the light source having a band spectrum is a deuterium source.

4. A device according to claim 1, characterised in that the photoelectric detector is a photomultiplier.

5. A device according to claim 1 characterised in that the light source having a band spectrum is a vacuum source.

* * * * *